United States Patent
Kaku et al.

(10) Patent No.: US 11,217,808 B2
(45) Date of Patent: Jan. 4, 2022

(54) RAW MATERIAL OF ELECTROLYTE SOLUTION, METHOD FOR MANUFACTURING ELECTROLYTE SOLUTION AND METHOD FOR MANUFACTURING REDOX FLOW BATTERY

(71) Applicants: SUMITOMO ELECTRIC INDUSTRIES, LTD., Osaka (JP); TAYCA CORPORATION, Osaka (JP)

(72) Inventors: Hirokazu Kaku, Osaka (JP); Ryouta Tatsumi, Osaka (JP); Tatsuya Tsurumura, Osaka (JP)

(73) Assignees: SUMITOMO ELECTRIC INDUSTRIES, LTD., Osaka (JP); TAYCA CORPORATION, Osaka (JP)

( * ) Notice: Subject to any disclaimer, the term of this patent is extended or adjusted under 35 U.S.C. 154(b) by 0 days.

(21) Appl. No.: 16/760,654

(22) PCT Filed: Nov. 2, 2018

(86) PCT No.: PCT/JP2018/040913
§ 371 (c)(1),
(2) Date: Apr. 30, 2020

(87) PCT Pub. No.: WO2019/093252
PCT Pub. Date: May 16, 2019

(65) Prior Publication Data
US 2020/0350607 A1 Nov. 5, 2020

(30) Foreign Application Priority Data

Nov. 7, 2017 (JP) .............................. JP2017-214891

(51) Int. Cl.
*H01M 8/1016* (2016.01)
*H01M 8/08* (2016.01)
(Continued)

(52) U.S. Cl.
CPC ........... *H01M 8/1016* (2013.01); *H01M 8/08* (2013.01); *H01M 8/188* (2013.01);
(Continued)

(58) Field of Classification Search
CPC .................................................... H01M 8/1016
See application file for complete search history.

(56) References Cited

U.S. PATENT DOCUMENTS

2002/0119090 A1  8/2002  Tanaka et al.
2005/0287436 A1  12/2005  Kawashige et al.
(Continued)

FOREIGN PATENT DOCUMENTS

EP  2387092 A1  11/2011
EP  2541660 A1  1/2013
(Continued)

OTHER PUBLICATIONS

Feb. 5, 2019 International Search Report issued in International Patent Application No. PCT/JP2018/040913.
(Continued)

*Primary Examiner* — Brian R Ohara
(74) *Attorney, Agent, or Firm* — Oliff PLC

(57) ABSTRACT

A raw material of an electrolyte solution that is to be dissolved in a solvent to form an electrolyte solution, and the raw material of an electrolyte solution is a raw material of an electrolyte solution that is a solid or semisolid that contains Ti in an amount of 2 mass % to 83 mass % inclusive, Mn in an amount of 3 mass % to 86 mass % inclusive, and S in an amount of 6 mass % to 91 mass % inclusive.

6 Claims, 2 Drawing Sheets

(51) Int. Cl.
*H01M 8/18* (2006.01)
*H01M 4/86* (2006.01)

(52) U.S. Cl.
CPC ............... *H01M 2004/8684* (2013.01); *H01M 2004/8689* (2013.01); *H01M 2300/0005* (2013.01)

(56) References Cited

U.S. PATENT DOCUMENTS

| | | |
|---|---|---|
| 2012/0045680 A1 | 2/2012 | Dong et al. |
| 2013/0045400 A1 | 2/2013 | Dong et al. |
| 2014/0134465 A1 | 5/2014 | Kumamoto et al. |
| 2016/0141616 A1* | 5/2016 | Seo ..................... H01M 4/136 252/182.1 |
| 2018/0190991 A1* | 7/2018 | Hanafusa ................ H01M 4/96 |

FOREIGN PATENT DOCUMENTS

| | | |
|---|---|---|
| JP | 2002-193621 A | 7/2002 |
| JP | 2003-331902 A | 11/2003 |
| JP | 2012-79679 A | 4/2012 |
| JP | 2013-8642 A | 1/2013 |
| WO | 2011/111254 A1 | 9/2011 |
| WO | 2017/103578 A1 | 6/2017 |

OTHER PUBLICATIONS

Oct. 7, 2021 Extended European Search Report issued in European Patent Application No. 18875401.4.

* cited by examiner

RAW MATERIAL OF ELECTROLYTE SOLUTION, METHOD FOR MANUFACTURING ELECTROLYTE SOLUTION AND METHOD FOR MANUFACTURING REDOX FLOW BATTERY

TECHNICAL FIELD

The present disclosure relates to a raw material of an electrolyte solution, a method for manufacturing an electrolyte solution, and a method for manufacturing a redox flow battery.

The present application claims the benefit of priority based on Japanese Patent Application No. 2017-214891 filed on Nov. 7, 2017, which is incorporated herein by reference in its entirety.

BACKGROUND ART

A redox flow battery (an RF battery) disclosed in Patent Document 1 is known as one type of large-capacity storage batteries for storing power originating from natural energy, such as solar photovoltaic power generation and wind power generation. In the RF battery disclosed in Patent Document 1, an electrolyte solution that contains manganese ions and titanium ions as active materials is used as the electrolyte solution for both a positive electrode and a negative electrode.

CITATION LIST

Patent Documents

Patent Document 1: WO 2011/111254

SUMMARY OF INVENTION

A raw material of an electrolyte solution according to the present disclosure is a raw material of an electrolyte solution that is to be dissolved in a solvent to form an electrolyte solution, comprising:
 Ti in an amount of 2 mass % to 83 mass % inclusive;
 Mn in an amount of 3 mass % to 86 mass % inclusive; and
 S in an amount of 6 mass % to 91 mass % inclusive, in which the raw material of an electrolyte solution is a solid or semisolid.

A method for manufacturing an electrolyte solution according to the present disclosure includes
 a step of dissolving the raw material of an electrolyte solution according to the present disclosure in a solvent of an electrolyte solution.

A method for manufacturing a redox flow battery according to the present disclosure includes
 a step of storing an electrolyte solution in tanks to be connected to a battery cell provided with a positive electrode, a negative electrode, and a membrane interposed between the positive electrode and the negative electrode,
 in which the electrolyte solution is formed by dissolving a raw material of an electrolyte solution in a solvent, and
 the raw material of an electrolyte solution is a solid or semisolid comprising
 Ti in an amount of 2 mass % to 83 mass % inclusive;
 Mn in an amount of 3 mass % to 86 mass % inclusive; and
 S in an amount of 6 mass % to 91 mass % inclusive.

DESCRIPTION OF EMBODIMENTS

Figure 1:
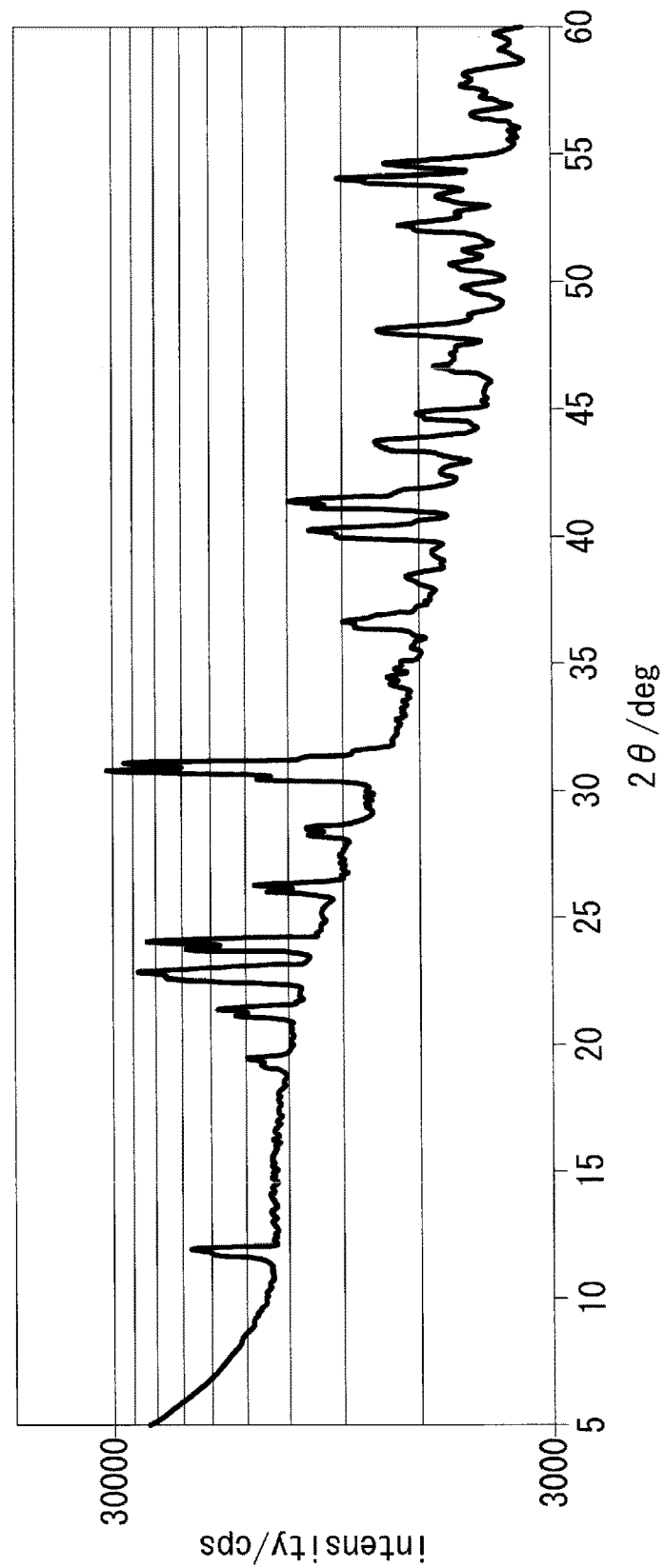
FIG. 1 is a semilogarithmic graph (a logarithmic scale is used for the vertical axis) showing the analysis results obtained when a raw material of an electrolyte solution according to an embodiment was subjected to X-ray diffraction.

Problem to be Solved by the Present Disclosure

The above-described electrolyte solution is manufactured by dissolving, as solutes (raw materials of electrolyte solutions), sulfates (manganese sulfate and titanium sulfate) in a solvent (e.g., a sulfuric acid aqueous solution) of the electrolyte solutions. Because the dissolution time is long, there is demand for solutes that can readily dissolve.

In view of this, an object of the present disclosure is to provide a raw material of an electrolyte solution that can readily dissolve and by which the dissolution time can be shortened.

Also, an object thereof is to provide a method for manufacturing an electrolyte solution by which an electrolyte solution is manufactured using the above-described raw material of an electrolyte solution.

Also, an object thereof is to provide a method for manufacturing a redox flow battery by which a redox flow battery is manufactured using an electrolyte solution obtained by dissolving the above-described raw material of an electrolyte solution.

Advantageous Effects of the Present Disclosure

The above-described raw material of an electrolyte solution can readily dissolve, and the dissolution time can be shortened.

The above-described method for manufacturing an electrolyte solution makes it possible to manufacture an electrolyte solution in a short period of time.

The above-described method for manufacturing a redox flow battery provides high productivity of redox flow batteries.

Description of Embodiments of the Present Disclosure

First, embodiments of the present disclosure will be described below.

(1) A raw material of an electrolyte solution according to an aspect of the present disclosure is a raw material of an electrolyte solution comprising:
 Ti in an amount of 2 mass % to 83 mass % inclusive;
 Mn in an amount of 3 mass % to 86 mass % inclusive; and
 S in an amount of 6 mass % to 91 mass % inclusive,
 in which the raw material of an electrolyte solution is a solid or semisolid.

According to the above-described configuration, the raw material can readily dissolve, and the dissolution time can be shortened.

(2) As one mode of the above-described raw material of an electrolyte solution,
 at least one of the first to third highest peaks in X-ray diffraction is located in at least one range of 20.0° to 25.0° inclusive and 27.5° to 32.5° inclusive of 2θ.

According to the above-described configuration, the raw material can readily dissolve, and the dissolution time can be shortened.

(3) As one mode of the above-described raw material of an electrolyte solution, a peak in X-ray diffraction is located in at least one range of 11.90°±0.5°, 24.05°±0.5°, 30.75°±0.5°, and 41.35°±0.5° of 2θ.

According to the above-described configuration, the raw material can readily dissolve, and the dissolution time can be shortened.

(4) As one mode of the above-described raw material of an electrolyte solution, a peak in X-ray diffraction is located in at least one range of 19.45°±0.5°, 26.00°±0.5°, 48.10°±0.5°, and 54.00°±0.5° of 2θ.

According to the above-described configuration, the raw material can readily dissolve, and the dissolution time can be shortened.

(5) As one mode of the above-described raw material of an electrolyte solution, a peak in X-ray diffraction is located in at least one range of 22.80°±0.5°, 40.20°±0.5°, and 43.70°±0.5° of 2θ.

According to the above-described configuration, the raw material can readily dissolve, and the dissolution time can be shortened.

(6) A method for manufacturing an electrolyte solution according to an aspect of the present disclosure includes a step of dissolving the raw material of an electrolyte solution according to any one of (1) to (5) described above in a solvent of an electrolyte solution.

According to the above-described configuration, an electrolyte solution can be manufactured in a short period of time. This is because a raw material of an electrolyte solution that can readily dissolve simply needs to be dissolved therein.

(7) A method for manufacturing a redox flow battery according to an aspect of the present disclosure includes a step of storing an electrolyte solution in tanks to be connected to a battery cell provided with a positive electrode, a negative electrode, and a membrane interposed between the positive electrode and the negative electrode, in which the electrolyte solution is formed by dissolving a raw material of an electrolyte solution in a solvent, and the raw material of an electrolyte solution is a solid or semisolid comprising Ti in an amount of 2 mass % to 83 mass % inclusive;

Mn in an amount of 3 mass % to 86 mass % inclusive; and

S in an amount of 6 mass % to 91 mass % inclusive.

The above-described configuration provides high productivity of redox flow batteries. This is because the time for manufacturing an electrolyte solution to be stored in a tank is short.

Details of Embodiments of the Present Disclosure

Embodiments of the present disclosure will be described in detail below. Embodiments of a raw material of an electrolyte solution, a method for manufacturing an electrolyte solution, and a method for manufacturing a redox flow battery will be described in the stated order.

Raw Material of Electrolyte Solution

A raw material of an electrolyte solution according to an embodiment will be described with reference to FIG. 1 (the thick line shown in FIG. 2 as appropriate). The raw material of an electrolyte solution according to an embodiment is dissolved in a solvent (described later) of an electrolyte solution to form the electrolyte solution. Typically, this electrolyte solution is utilized as an electrolyte solution used in a redox flow (RF) battery (not shown). One of the characteristics of the raw material of an electrolyte solution is that the raw material of an electrolyte solution is a solid or semisolid that contains specific amounts of Ti, Mn, and S. The following describes the raw material of an electrolyte solution in detail.

The raw material of an electrolyte solution is a solid or semisolid that contains Ti, Mn, and S. Examples of the solid include powder and a compact obtained by subjecting a powder to press compacting. An example of the semisolid is paste. That is, particles that constitute the powder or a compact, or a paste contains specific amounts of Ti, Mn, and S. The specific composition formula of the raw material (particles or paste) of an electrolyte solution is unclear. Examples of the Ti content are 2 mass % to 83 mass % inclusive, 6 mass % to 65 mass % inclusive, and in particular, 15 mass % to 52 mass % inclusive. Examples of the Mn content are 3 mass % to 86 mass % inclusive, 7 mass % to 70 mass % inclusive, and in particular, 18 mass % to 58 mass % inclusive. Examples of the S content are 6 mass % to 91 mass % inclusive, 10 mass % to 75 mass % inclusive, and in particular, 17 mass % to 52 mass % inclusive. As a result of the Ti content, the Mn content, and the S content satisfying the above-described ranges, an electrolyte solution that contains Ti ions and Mn ions as active materials can be easily formed.

The types of contained elements and the content thereof can be obtained through ICP (Inductively Coupled Plasma) emission spectroscopy.

Similarly to the above-described composition formula, the specific structure of the raw material (particles or paste) of an electrolyte solution is unclear. The raw material of an electrolyte solution has specific peaks when subjected to X-ray diffraction (XRD) with CuKα radiation (FIG. 1). That is, it can be thought that the raw material of an electrolyte solution has a crystal structure. Also, the crystal structure of the raw material of an electrolyte solution does not have some of the peaks of a mixed powder of titanium sulfate and manganese sulfate (FIG. 1, and the thick line shown in FIG. 2 as appropriate).

FIG. 1 is a semilogarithmic graph (a logarithmic scale is used for the vertical axis) showing the analysis results obtained when a raw material (powder) of an electrolyte solution according to the embodiment was subjected to X-ray diffraction. The thick line shown in FIG. 2 indicates a semilogarithmic graph (a logarithmic scale is used for the vertical axis) showing the analysis results obtained when a mixed powder obtained by mixing titanium sulfate and manganese sulfate such that the mole ratio thereof was 1:1 was subjected to X-ray diffraction. Note that, for reference, the analysis results obtained when a titanium sulfate powder was subjected to X-ray diffraction (the thin line) and the analysis results obtained when a manganese sulfate powder was subjected to X-ray diffraction (the dotted line) are shown in FIG. 2. The vertical axes shown in FIGS. 1 and 2 indicate the peak intensity (intensity/cps (count per second)), and the horizontal axis indicates the peak position (2θ/deg).

In the following description, the peak position refers to a position in terms of 2θ when a raw material is subjected to X-ray diffraction with CuKα radiation, unless otherwise specified. In the following description, the intensity of a peak refers to a difference between the vertex of a peak and the base line of the peak obtained through X-ray diffraction analyses, unless otherwise specified. That is, the peak intensity refers to a peak intensity from which the background has been removed. The background can be defined as the same as the intensity obtained when XRD measurement is performed without a measurement sample and under the same measurement conditions as when a measurement sample is subjected to measurement. The base line of a peak refers to a line that connects points where no peaks are present.

With the raw material of an electrolyte solution (particles and paste), at least one of the first to third highest peaks is located in at least one range of 20.0° to 25.0° inclusive, and 27.5° to 32.5° inclusive, for example (FIG. 1). The first highest (the maximum intensity) peak is located in a range of 27.5° to 32.5° inclusive, for example (FIG. 1). Because at least one of the first to third highest peaks is located in a range of 27.5° to 32.5° inclusive, the raw material can readily dissolve in a solvent (described later), and the dissolution time can be shortened, although the specific mechanism is unclear. It is conceivable that the raw material of an electrolyte solution can readily dissolve in a solvent because the raw material contains Ti and Mn, instead of a titanium sulfate powder and a manganese sulfate powder, or a mixed powder of titanium sulfate and manganese sulfate.

The maximum intensity peak for the above-described mixed powder of titanium sulfate and manganese sulfate is not present in a range of 27.5° to 32.5° inclusive. The maximum intensity peak for the above-described mixed powder is present in a range of 11.10° or less (the thick line in FIG. 2). The maximum intensity peak for the mixed powder is located in a range of 10.60°±0.5°, for example.

In contrast, the maximum intensity peak for the raw material of an electrolyte solution of this example is not present in a range of 11.10° or less, or, for example, in a range of 10.60°±0.5° (FIG. 1). The maximum intensity peak in the raw material of an electrolyte solution of this example is located in a range of 30.75°±0.5°, for example. A half-value width of this peak exhibiting the maximum intensity is 1° or less, for example. The intensity of a peak in a range of 11.10° or less for the raw material of an electrolyte solution of this example, for example, in a range of 10.60°±0.5° (the position of the maximum intensity peak for the above-described mixed powder), is 20% or less, 15% or less, and, in particular, 10% or less of the above-described maximum peak intensity for this example, for example.

The second highest intensity peak for the raw material of an electrolyte solution is located in a range of 27.5° to 32.5° inclusive, for example. The second highest intensity peak for the above-described mixed powder is not present in a range of 27.5° to 32.5° inclusive. The second highest intensity peak in the above-described mixed powder is present in a range of 18.50°±0.5°, for example (the thick line in FIG. 2). In contrast, the second highest intensity peak for the raw material of an electrolyte solution of this example is not present in a range of 18.50°±0.5°, for example (FIG. 1). The second highest intensity peak for the raw material of an electrolyte solution of this example is located in a range of 31.10°±0.5°, for example. A half-value width of this peak exhibiting the second highest intensity is 1° or less, for example. The intensity of a peak located in a range of 18.50°±0.5° for the raw material of an electrolyte solution of this example (the position of the second highest intensity peak for the above-described mixed powder) is 20% or less, 15% or less, and, in particular, 10% or less of the above-described second highest peak intensity in this example, for example.

The third highest intensity peak for the raw material of an electrolyte solution is located in a range of 20.0° to 25.0° inclusive, for example. The third highest intensity peak for the above-described mixed powder is not present in a range of 20.0° to 25.0° inclusive, for example. The third highest intensity peak for the above-described mixed powder is present in a range of 25.60°±0.5°, for example (the thick line in FIG. 2). In contrast, the third highest intensity peak for the raw material of an electrolyte solution of this example is not present in a range of 25.60°±0.5°, for example (FIG. 1). The third highest intensity peak for the raw material of an electrolyte solution of this example is located in at least one range of 22.80°±0.5°, and 24.05°±0.5°, for example. A half-value width of this peak exhibiting the third highest intensity is 1° or less, for example. The intensity of a peak located in a range of 25.60°±0.5° for the raw material of an electrolyte solution of this example (the position of the third highest intensity peak for the above-described mixed powder) is 20% or less, 15% or less, and, in particular, 10% or less of the above-described third highest peak intensity for this example, for example.

All of the first to third highest intensity peaks may be located in a range of 20.0° to 25.0° inclusive or 27.5° to 32.5° inclusive. Also, the positions of the first to third highest intensity peaks are allowed to be replaced with each other. This is because even if compounds with the same composition are used, peak intensity ratios may change due to XRD measurement being affected by crystal orientation and the like. The first highest peak and the second highest peak may be located in a range of 20.0° to 25.0° inclusive, instead of the above-described range of 27.5° to 32.5° inclusive, and the third highest peak may be located in a range of 27.5° to 32.5° inclusive, instead of the above-described range of 20.0° to 25.0° inclusive, for example. The third highest peak and one of the first highest peak and the second highest peak may be located in one range of 20.0° to 25.0° inclusive and 27.5° to 32.5° inclusive, and the other of the first highest peak and the second highest peak may be located in the other range of 20.0° to 25.0° inclusive and 27.5° to 32.5° inclusive. As described above, if the first highest peak and the second highest peak are located in a range of 27.5° to 32.5° inclusive, the first highest peak may be located in a range of 31.10°±0.5°, instead of a range of 30.75°±0.5°, and the second highest peak may be located in a range of 30.75°±0.5°, instead of a range of 31.10°±0.5°.

Also, a peak of the raw material of an electrolyte solution is located in at least one range of 11.90°±0.5°, 19.45°±0.5°, 26.00°±0.5°, 41.35°±0.5°, 48.10°±0.5°, and 54.00°±0.5°. The half-value widths of peaks located in these ranges are 1° or less, for example. Also, a peak for the raw material of an electrolyte solution is located in at least one range of 40.20°±0.5°, and 43.70°±0.5°, for example. The half-value width of a peak located in this range is 1° or less, for example.

Applications

The raw material of an electrolyte solution according to the embodiment can be suitably utilized as a raw material of an electrolyte solution used in an RF battery.

Effects of Raw Material of Electrolyte Solution

The raw material of an electrolyte solution according to the embodiment can readily dissolve. Thus, the dissolution time can be shortened. Therefore, if a solvent of an electrolyte solution can be obtained at a site where an RF battery is installed, only the raw material of an electrolyte solution is conveyed to the site where the RF battery is installed, and the electrolyte solution can be manufactured by dissolving the raw material in the solvent at the installation site. In this case, the electrolyte solution obtained by dissolving the raw material of an electrolyte solution need not be conveyed to the site where the RF battery is installed. In particular, if an electrolyte solution is used at the destination of the battery (in Japan or overseas), the material to be transported needs only to be the raw material of an electrolyte solution. Thus, the labor and cost of transportation can be significantly reduced, compared to a case where an electrolyte solution is transported. This is because the raw material of an electrolyte solution is small in volume and is light in weight. Also, with the raw material of an electrolyte solution, an electrolyte solution with a desired concentration can be manufactured by simply selecting the composition of the raw material of an electrolyte solution as appropriate. Thus, the concentration (components) of the electrolyte solution can be easily adjusted.

Method for Manufacturing Raw Material of Electrolyte Solution

Manufacturing of the above-described raw material of an electrolyte solution can be selected as appropriate according to the form of the raw material of an electrolyte solution. The above-described raw material of an electrolyte solution can be manufactured using methods (I) to (III) for manufacturing a raw material of an electrolyte solution. The method (I) for manufacturing a raw material of an electrolyte solution is a method for manufacturing a semisolid (paste) raw material of an electrolyte solution, and the method (I) includes a preparation process, a stirring process, and a filtration process. The method (II) for manufacturing a raw material of an electrolyte solution is a method for manufacturing a solid (powder) raw material of an electrolyte solution, and the method (II) further includes a drying process performed after the filtration process in the method (I) for manufacturing a raw material of an electrolyte solution. That is, the method (II) for manufacturing a raw material of an electrolyte solution includes a preparation process, a stirring process, a filtration process, and a drying process. The method (III) for manufacturing a raw material of an electrolyte solution is a method for manufacturing a solid (compact) raw material of an electrolyte solution, and the method (III) further includes a molding process performed after the drying process in the method (II) for manufacturing a raw material of an electrolyte solution. That is, the method (III) for manufacturing a raw material of an electrolyte solution includes a preparation process, a stirring process, a filtration process, a drying process, and a molding process. The above-described raw material of an electrolyte solution is manufactured using the methods (I) to (III) for manufacturing a raw material of an electrolyte solution. The following describes each process in detail.

Method (I) for Manufacturing Raw Material of Electrolyte Solution

Preparation Process

A sulfuric acid solution in which Ti and Mn are dissolved is prepared in the preparation process. The concentrations of Ti and Mn in this sulfuric acid solution are preferably high. A raw material (particles and paste) of an electrolyte solution that contains a large amount of Ti, Mn, and S can be easily manufactured using a sulfuric acid solution with a high Ti and Mn concentration. Also, it is expected that the speed of producing a solid or semisolid that contains Ti, Mn, and S will be increased. A "high concentration" here refers to the Ti content and the Mn content in a sulfuric acid solution each being 0.3 mol/L (M) or more. The Ti content and the Mn content are more preferably 0.5 M or more, and particularly preferably 1.0 M or more, respectively. An example of the upper limit for both the Ti content and the Mn content is about 5.0 M or less. The content of Ti and Mn in the raw material of an electrolyte solution to be manufactured can be adjusted by adjusting the concentrations of Ti and Mn.

Stirring Process

The sulfuric acid solution prepared in the preparation process is stirred in the stirring process. Precipitates are formed in the sulfuric acid solution by stirring the sulfuric acid solution. Although precipitates may be formed simply by leaving the above-described sulfuric acid solution without stirring the sulfuric acid solution, the time taken for precipitation can be shortened by stirring the above-described sulfuric acid solution. When the sulfuric acid solution is stirred, it is preferable to add an additive agent to the sulfuric acid solution. Addition of an additive agent facilitates the formation of precipitates. At least one of (a) Ti powder and Mn powder and (b) a sulfuric acid solution is an example of the additive agent. The Ti powder that is added is titanyl sulfate ($TiSO_4.2H_2O$), for example. The Mn powder that is added is manganese sulfate, for example. The addition amount of the powder is an amount such that the number of moles of Ti and Mn in a sulfuric acid solution obtained after the above-described powder has been introduced is 1.005 times or more and 1.05 times or less the number of moles of Ti and Mn in a sulfuric acid solution before the above-described powder is introduced, for example. The concentration of sulfuric acid in a sulfuric acid solution that is added is preferably 70 mass % or more, more preferably 80 mass % or more, and particularly preferably 90 mass % or more. The concentration of sulfuric acid in a sulfuric acid solution that is added is most preferably about 98 mass %. The addition amount of sulfuric acid solution is preferably an amount such that the concentration of sulfuric acid after the sulfuric acid solution has been introduced is 3.0 M or more, more preferably an amount such that the concentration of sulfuric acid after the sulfuric acid solution has been introduced is 5.0 M or more, particularly preferably an amount such that the concentration of sulfuric acid after the sulfuric acid solution has been introduced is 6.0 M or more, and most preferably an amount such that the concentration of sulfuric acid after the sulfuric acid solution has been introduced is 7.0 M or more, for example. The upper limit of the addition amount of sulfuric acid solution is an amount such that the concentration of sulfuric acid after the sulfuric acid solution has been introduced is about 10.0 M, for example. Stirring is performed using an appropriate method, and a stirrer or the like can be used, for example. After stirring is stopped, formed precipitates are settled in the sulfuric acid solution.

Filtration Process

The sulfuric acid solution that contains the above-described precipitate is filtered in the filtration process. The precipitates and a supernatant liquid are separated by filtering the sulfuric acid solution to obtain the precipitates. The obtained precipitates are in a paste. This paste contains Ti, Mn, and S, and the above-described specific peaks are present at specific positions.

Method (II) for Manufacturing Raw Material of Electrolyte Solution

Drying Process

The precipitates obtained in the filtration process are dried in the drying process. A powdery raw material of an electrolyte solution is produced by drying the precipitates. Particles that constitute the raw material of an electrolyte solution contain Ti, Mn, and S, and the above-described specific peaks are present at specific positions. The precipitate can be more quickly dried by wiping off moisture with filter paper, for example, compared to a case where the precipitates are left as is. The drying process may be performed by heating the precipitates.

Method (III) for Manufacturing Raw Material of Electrolyte Solution

Molding Process

The raw material powder of an electrolyte solution produced in the drying process is subjected to press-compacting in the molding process. A compact of the raw material of an electrolyte solution is produced through press-compacting. Particles that constitute the powder compact contain Ti, Mn, and S, and the above-described specific peaks are present at specific positions. The mass (size) of one produced powder compact may be set to a mass (size) corresponding to nL (n=any numerical value, L=liter) of solvent, for example. Accordingly, an electrolyte solution can be easily prepared by adjusting the number of powder compacts according to the volume of a solvent.

Applications

The above-described method for manufacturing a raw material of an electrolyte solution can be suitably utilized to manufacture a raw material of an electrolyte solution used in an RF battery. The raw material of an electrolyte solution manufactured using the above-described method for manufacturing a raw material of an electrolyte solution can also be suitably utilized as the above-described additive agent in the above-described stirring process.

Effects of Method for Manufacturing Raw Material of Electrolyte Solution

A raw material of an electrolyte solution that can readily dissolve and by which the dissolution time can be shortened can be manufactured using the method for manufacturing a raw material of an electrolyte solution. In particular, the raw material of an electrolyte solution can be easily manufactured. This is because stirring, filtration, drying, and molding are all simple operations. Also, raw materials of electrolyte solutions with various compositions can be easily manufactured. This is because the Ti content and the Mn content in the raw material of an electrolyte solution to be manufactured can be adjusted by adjusting the concentrations of Ti and Mn in a sulfuric acid solution prepared.

Method for Manufacturing Electrolyte Solution

The raw material of an electrolyte solution according to the above-described embodiment, or a raw material of an electrolyte solution manufactured using the above-described method for manufacturing a raw material of an electrolyte solution is for forming an electrolyte solution as in the manner described above. The electrolyte solution is manufactured using a method for manufacturing an electrolyte solution that includes a dissolution process.

Dissolution Process

In the dissolution process, the raw material of an electrolyte solution according to the embodiment, or a raw material of an electrolyte solution manufactured using the above-described method for manufacturing a raw material of an electrolyte solution is dissolved in a solvent of an electrolyte solution. An electrolyte solution, or, in particular, an electrolyte solution for an RF battery, can be manufactured through this dissolution.

Examples of types of solvent of an electrolyte solution include at least one selected from $H_2SO_4$, $K_2SO_4$, $Na_2SO_4$, $H_3PO_4$, $H_4P_2O_7$, $K_2HPO_4$, $Na_3PO_4$, $K_3PO_4$, $HNO_3$, $KNO_3$, HCl, and $NaNO_3$ aqueous solutions. In addition, the types of solvent of the electrolyte solution include organic acid solutions and water.

This electrolyte solution contains Ti ions, Mn ions, and S ions (sulfate ions: $SO_4^{2-}$). This is because the raw material of an electrolyte solution that is to be dissolved contains Ti, Mn, and S as described above. The concentration of Ti ions and the concentration of Mn ions in the electrolyte solution are respectively preferably 0.3 M to 5.0 M inclusive, more preferably 0.5 M or more, and particularly preferably 1.0 M or more. The concentration of S ions (sulfate ions: $SO_4^{2-}$) in the electrolyte solution is preferably 1.0 M to 10.0 M inclusive, more preferably 1.0 M to 5.0 M inclusive, and particularly preferably 1.0 M to 4.0 M inclusive. The valence of Ti ions in the electrolyte solution is preferably tetravalent, and the valence of Mn ions therein is preferably divalent.

Applications

The method for manufacturing a raw material of an electrolyte solution according to the embodiment can be suitably utilized to manufacture an electrolyte solution used in an RF battery.

Effects of Method for Manufacturing Electrolyte Solution

An electrolyte solution can be manufactured in a short period of time using the method for manufacturing an electrolyte solution according to the embodiment. This is because a raw material of an electrolyte solution that can readily dissolve simply needs to be dissolved.

Method for Manufacturing Redox Flow Battery

An electrolyte solution manufactured using the method for manufacturing an electrolyte solution according to the above-described embodiment is utilized as an electrolyte solution of an RF battery as described above. Typically, an RF battery includes a battery cell, tanks (for a positive electrode and for a negative electrode), and circulation mechanisms (for a positive electrode and for a negative electrode). The battery cell includes a positive electrode, a negative electrode, and a membrane interposed between the positive electrode and the negative electrode. A tank stores an electrolyte solution. A circulation mechanism connects the battery cell and the tank, and supplies the electrolyte solution to the battery cell, and circulates the electrolyte solution. A known configuration excluding an electrolyte solution can be utilized for an RF battery. An RF battery is manufactured using a method for manufacturing an RF battery that includes a storage process.

Storage Process

An electrolyte solution is stored in a tank in the storage process. This electrolyte solution is formed by dissolving a raw material of an electrolyte solution in a solvent, and is manufactured using the method for manufacturing an electrolyte solution according to the above-described embodiment. The raw material of an electrolyte solution is a raw material of an electrolyte solution according to the above-described embodiment, or a raw material of an electrolyte solution manufactured using the above-described method for manufacturing a raw material of an electrolyte solution. That is, the raw material of an electrolyte solution is a solid or semisolid that contains Ti in an amount of 2 mass % to 83 mass % inclusive, Mn in an amount of 3 mass % to 86 mass % inclusive, and S in an amount of 6 mass % to 91 mass % inclusive. The above-described solvent can be utilized as a solvent. In the storage process, the electrolyte solution may be produced in a tank and stored in the tank, or an electrolyte solution that is separately produced outside the tank may be poured into the tank and stored in the tank. If an electrolyte solution is produced in the tank, a solvent (a sulfuric acid solution) may be stored in the tank, and a raw material of an electrolyte solution may be dissolved by introducing the raw material into the solvent.

Applications

The method for manufacturing an RF battery according to the embodiment can be suitably utilized to manufacture an RF battery.

Effects of Method for Manufacturing Redox Flow Battery

The method for manufacturing an RF battery according to the embodiment provides high productivity of RF batteries. This is because the time for manufacturing an electrolyte solution to be stored in a tank is short.

Test Example 1

Raw materials of an electrolyte solution were produced, the structures of the raw materials of an electrolyte solution were analyzed, and the solubility thereof was evaluated.

Sample No. 1-1

Similarly to the above-described method (II) for manufacturing a raw material of an electrolyte solution, a raw material of an electrolyte solution of Sample No. 1-1 was produced through the preparation process, the stirring process, the filtration process, and the drying process in the stated order. That is, the produced raw material of an electrolyte solution of Sample No. 1-1 was a powder.

Preparation Process

In the preparation process, a sulfuric acid solution in which the Ti concentration was 1.5 M, the Mn concentration was 1.2 M, and the S concentration was 7.0 M was prepared. The sulfuric acid solution was produced by preparing a titanium sulfate powder and a manganese sulfate powder, and dissolving both powders in a sulfuric acid solvent.

Stirring Process

The above-described sulfuric acid solution was stirred using a stirrer in the stirring process. Stirring was performed until a certain amount of precipitates precipitated in the sulfuric acid solution.

Filtration Process

The precipitates were obtained by separating the precipitates and a supernatant in the filtration process.

Drying Process

In the drying process, raw material powder of an electrolyte solution was produced by wiping the obtained precipitate paste with filter paper and drying the paste until the paste took on a powdery form.

Component Analysis

Components of the raw material of an electrolyte solution were analyzed through ICP emission spectroscopy. The analyses were performed using a commercially available ICP emission spectrometer (iCAP6300 manufactured by Thermo Fisher Scientific K.K.).

The raw material of an electrolyte solution of Sample No. 1-1 contained Ti in an amount of 8.39 mass %, Mn in an amount of 9.01 mass %, and S in an amount of 14.82 mass %. From this result, it can be estimated that the mole ratio of Ti, Mn, and S in Sample No. 1-1 was Ti:Mn:S=1.0:0.9:2.6, and the composition of Sample No. 1-1 was $Ti_{1.0}Mn_{0.9}SO_{4(2.6)} \cdot 12H_2O$, for example.

Sample No. 1-101

The raw material of an electrolyte solution of Sample No. 1-101 was produced by preparing a titanium sulfate powder and a manganese sulfate powder, and mixing both powders such that the mole ratio thereof was 1:1.

Structural Analysis

The raw material of an electrolyte solution of each sample was subjected to X-ray diffraction with CuKα radiation, and peak positions and intensities of the raw materials of an electrolyte solution were analyzed. The analyses were performed using a commercially available XRD apparatus (X'pert-PRO manufactured by Philips). FIG. 1 shows a semilogarithmic graph (a logarithmic scale is used for the vertical axis) that shows the results of analyses of Sample No. 1-1. The thick line shown in FIG. 2 indicates the semilogarithmic graph (a logarithmic scale is used for the vertical axis) that shows the results of analyses of Sample No. 1-101. For reference, the analysis results obtained when the titanium sulfate powder of Sample No. 1-101 was subjected in the same manner to X-ray diffraction (the thin line) and the analysis results obtained when the manganese sulfate powder of Sample No. 1-101 was subjected in the same manner to X-ray diffraction (the dotted line) are shown together in FIG. 2. The vertical axes shown in FIGS. 1 and 2 indicate the peak intensity (intensity/cps (count per second)), and the horizontal axis indicates the peak position (2θ/deg).

It was found that, as shown in FIG. 1, with the raw material of an electrolyte solution of Sample No. 1-1, the maximum intensity peak was not located in a range of 10.60°±0.5°. It was found that the maximum intensity peak was located in a range of 27.5° to 32.5° inclusive, or, more specifically, at approximately 30.75°. Also, it was found that the second highest intensity peak was not located in a range of 18.50°±0.5°. It was found that the second highest intensity peak was located in a range of 27.5° to 32.5° inclusive, or, more specifically, at approximately 31.10°. Also, it was found that the third highest intensity peak was not located in a range of 25.60°±0.5°. It was found that the third highest intensity peak was located in a range of 20° to 25° inclusive, or, more specifically, at approximately 22.80° and approximately 24.05°. It was found that all of the half-value widths of peaks exhibiting these intensities were 1° or less. Also, it was found that the other peaks were located typically at approximately 11.90°, 19.45°, 26.00°, 40.20°, 41.35°, 43.70°, 48.10°, 54.00°, and the like.

Figure 2:
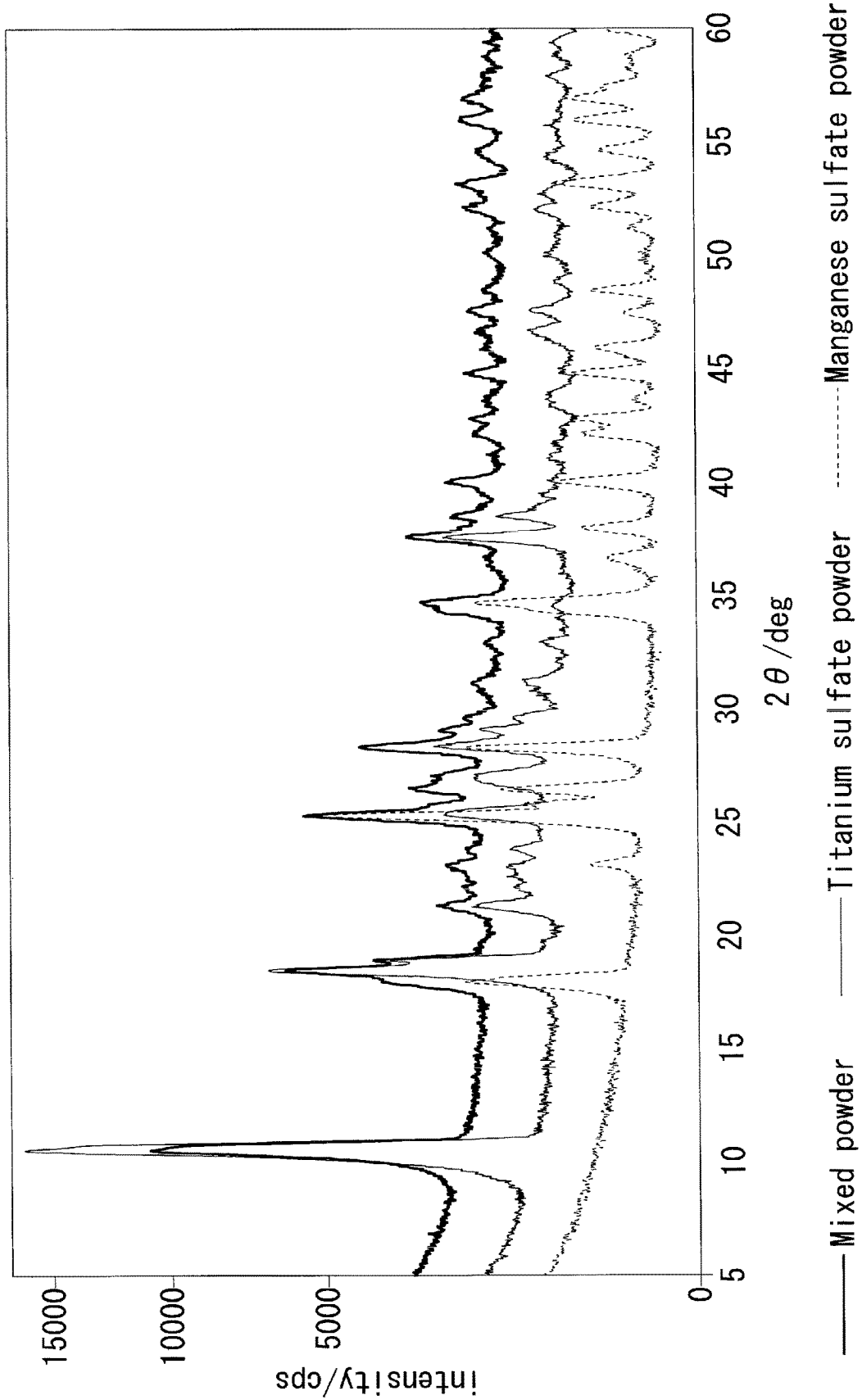
FIG. 2 is a semilogarithmic graph (a logarithmic scale is used for the vertical axis) showing the analysis results obtained when a mixed powder of titanium sulfate and manganese sulfate, a titanium sulfate powder, and a manganese sulfate powder were subjected to X-ray diffraction.

On the other hand, it was found that, as indicated by the thick line in FIG. 2, with the raw material of an electrolyte solution of Sample No. 1-101, the maximum intensity peak was not located in a range of 27.5° to 32.5° inclusive. It was found that the maximum intensity peak was located at 10.60°. Also, it was found that the second highest intensity peak was not located in a range of 27.5° to 32.5° inclusive. It was found that the second highest intensity peak was located at 18.50°. Also, it was found that the third highest intensity peak was not located in a range of 20° to 25° inclusive. It was found that the third highest intensity peak was located at 25.40°.

It was found that, as shown in FIGS. 1 and 2, the results of XRD analyses on the raw material of an electrolyte solution of Sample No. 1-1 were significantly different from the results of XRD analyses on the raw material of an electrolyte solution of Sample No. 1-101. Also, it was found that the results of XRD analyses on the raw material of an electrolyte solution of Sample No. 1-1 were significantly different from the results of XRD analyses on the titanium sulfate powder and the manganese sulfate powder of Sample No. 1-101. That is, it can be thought that the raw material of an electrolyte solution of Sample No. 1-1 is a substance that is different from the raw material of an electrolyte solution of Sample No. 1-101, and the titanium sulfate powder and the manganese sulfate powder of Sample No. 1-101.

Evaluation of Solubility

The solubility of the raw material of an electrolyte solution of each sample was evaluated. This evaluation was made by measuring the dissolution time of a raw material of an electrolyte solution in a solvent of the electrolyte solution. The dissolution time was defined as a time from when a raw material of an electrolyte solution and a solvent were mixed together to when the mixture turned transparent (an electrolyte solution). Here, two solvents, namely, 2.4 ml of 3 M sulfuric acid and pure water in the same amount as that of this sulfuric acid solvent were used. Each solvent and 1 g of the raw material of an electrolyte solution were mixed together.

When the sulfuric acid solvent was used, the dissolution time of the raw material of an electrolyte solution of Sample No. 1-1 was two minutes, and when pure water was used, the dissolution time thereof was one minute. On the other hand, when the sulfuric acid solvent was used, the dissolution time of the raw material of an electrolyte solution of Sample No. 1-101 was 180 minutes, and when pure water was used, the dissolution time thereof was 30 minutes. It was found that the dissolution time of the raw material of an electrolyte solution of Sample No. 1-1 was significantly shorter than the dissolution time of the raw material of an electrolyte solution of Sample No. 1-101 in this manner.

Similarly to the above-described component analyses, components of an electrolyte solution obtained by dissolving the raw materials of an electrolyte solution of Sample No. 1-1 and Sample No. 1-101 were analyzed through ICP emission spectroscopy. When the sulfuric acid solvent was used, with both Sample No. 1-1 and Sample No. 1-101, the Ti concentration was 0.61 M, the Mn concentration was 0.57 M, and the S concentration was 4.07 M in the electrolyte solution. Also, when pure water was used, with both Sample No. 1-1 and Sample No. 1-101, the Ti concentration was 0.61 M, the Mn concentration was 0.57 M, and the S concentration was 1.2 M in the electrolyte solution. From these results, it was found that the electrolyte solution obtained by dissolving, in a solvent, the raw material of an electrolyte solution of Sample No. 1-1 can be utilized as an electrolyte solution of an RF battery.

The present invention is defined by the terms of the claims, but not limited to the above description, and is intended to include any modifications within the meaning and scope equivalent to the terms of the claims.

The invention claimed is:

1. A raw material of an electrolyte solution that is to be dissolved in a solvent to form an electrolyte solution, comprising:
    Ti in an amount of 2 mass % to 83 mass % inclusive;
    Mn in an amount of 3 mass % to 86 mass % inclusive; and
    S in an amount of 6 mass % to 91 mass % inclusive,
    wherein the raw material of an electrolyte solution is a solid or semisolid, and
    wherein all of the first to third highest peaks in X-ray diffraction are located in at least one range of 20.0° to 25.0° inclusive and 27.5° to 32.5° inclusive of 2θ, and the first highest peak is located in a range of 27.5° to 32.5° inclusive of 2θ.

2. The raw material of an electrolyte solution according to claim 1,
    wherein a peak in X-ray diffraction is located in at least one range of 11.90°±0.5°, 24.05°±0.5°, 30.75°±0.5°, and 41.35°±0.5° of 2θ.

3. The raw material of an electrolyte solution according to claim 1,
    wherein a peak in X-ray diffraction is located in at least one range of 19.45°±0.5°, 26.00°±0.5°, 48.10°±0.5°, and 54.00°±0.5° of 2θ.

4. The raw material of an electrolyte solution according to claim 1,
    wherein a peak in X-ray diffraction is located in at least one range of 22.80°±0.5°, 40.20°±0.5°, and 43.70°±0.5° of 2θ.

5. A method for manufacturing an electrolyte solution, comprising
    a step of dissolving the raw material of an electrolyte solution according to claim 1 in a solvent of an electrolyte solution.

6. A method for manufacturing a redox flow battery, comprising
    a step of storing an electrolyte solution in tanks to be connected to a battery cell provided with a positive electrode, a negative electrode, and a membrane interposed between the positive electrode and the negative electrode,
    wherein the raw material of an electrolyte solution is a solid or semisolid comprising:
        Ti in an amount of 2 mass % to 83 mass % inclusive;
        Mn in an amount of 3 mass % to 86 mass % inclusive; and
        S in an amount of 6 mass % to 91 mass % inclusive, and
    wherein all of the first to third highest peaks in X-ray diffraction are located in at least one range of 20.0° to 25.0° inclusive and 27.5° to 32.5° inclusive of 2θ, and the first highest peak is located in a range of 27.5° to 32.5° inclusive of 2θ.

* * * * *